United States Patent Office 3,281,521
Patented Oct. 25, 1966

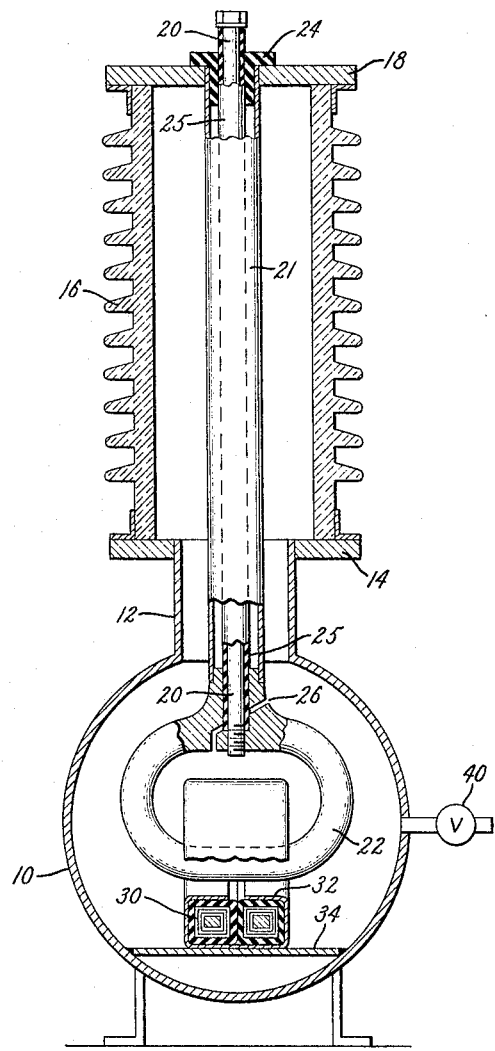

3,281,521
ELECTRICAL APPARATUS INSULATED WITH A MIXTURE OF INSULATING GASES
Walter R. Wilson, Wallingford, Pa., assignor to General Electric Company, a corporation of New York
Filed Mar. 16, 1965, Ser. No. 440,262
9 Claims. (Cl. 174—17)

This invention relates to electrical apparatus which is insulated with a mixture of insulating gases. The invention is also concerned with a method for incorporating the gaseous mixture into the apparatus.

For certain classes of electrical apparatus, industry standards require that the dew point of any gaseous insulation therein be at least as low as the range of $-30°$ C. to $-40°$ C. Sulfur hexafluoride ($SF_6$), which is a widely used gaseous insulation, can meet this requirement if its pressure, as measured in sealed apparatus at room temperature, is about 65 p.s.i. absolute or lower. The higher this pressure, the smaller may be the electrical clearances inside the apparatus. Accordingly, it is common to use pressures in the neighborhood of 65 p.s.i. absolute for $SF_6$-insulated apparatus. $SF_6$ has the advantage of high dielectric strength (e.g. about 2.2 times that of air) but has the disadvantage of being quite expensive.

Accordingly, an object of my invention is to provide gaseous insulation that has a dielectric strength substantially as high as that of $SF_6$ at 65 p.s.i.a., has a dew point below $-30°$ C., but is considerably less expensive than $SF_6$.

In carrying out the invention in one form, I utilize a mixture of nitrogen, dichlorodifluoromethane ($CCl_2F_2$), and sulfur hexafluoride ($SF_6$), the partial pressures at room temperature being 3-20 p.s.i.a. for the nitrogen, 5-15 p.s.i.a. for the $CCl_2F_2$, and 30-60 p.s.i.a. for the $SF_6$, the sum of the partial pressures of the nitrogen and $CCl_2F_2$ being 17-25 p.s.i.a.

Heretofore, not only has the quantity of $SF_6$ used in the finally-assembled pressurized apparatus been expensive, but in testing such apparatus prior to shipment from the factory, large quantities of the expensive gas have been lost for various reasons, thus further increasing the ultimate cost of the apparatus.

One type of factory test that can result in the loss of a considerable quantity of gas is a leak test. Such tests are typically conducted at high pressure and a large quantity of gas must first be added, after which any leaks are detected and repaired, after which most of the gas is removed so as to render the apparatus safe for shipment. It will be apparent that until the leaks in the apparatus are detected and are eliminated, substantial quantities of gas can be lost through such leaks and can also be lost in the handling involved in the addition and removal of the gas.

Another typical factory test is a high potential test to determine whether the apparatus has adequate dielectric strength. Although such tests need not be conducted with gas pressures and voltages exactly corresponding to field conditions, these tests should certainly provide a reliable indication of whether the apparatus will be able to withstand voltage conditions expected in the field.

Another object of the invention is to use for insulating the apparatus a mixture of $SF_6$ and other gases less expensive than $SF_6$ but to incorporate these gases in the apparatus in such a manner that there is no need to handle any $SF_6$ in the factory prior to shipment of the apparatus.

Still another object is to provide a method of incorporating the gaseous mixture which eliminates the need for handling $SF_6$ in the factory but yet permits reliable high potential tests to be performed in the factory.

In carrying out the method of my invention in one form, the following steps are relied upon. The enclosure of the apparatus is evacuated. The enclosure is then filled to a relative high pressure with a mixture of nitrogen and $CCl_2F_2$. The apparatus is then subjected to a high potential test and to a leak test while filled with said pressurized mixture of nitrogen and $CCl_2F_2$. A portion of the mixture is then removed to reduce the pressure to a relatively low value, but a value that substantially exceeds atmospheric pressure. All of the above-described steps are performed in the factory. The apparatus is then shipped to a field site with the mixture of nitrogen and $CCl_2F_2$. At the field site, a quantity of $SF_6$ is added sufficient to increase the pressure to the normal operating pressure of the apparatus.

In accordance with another embodiment of the invention, perfluorobutane ($C_2F_6$) is added at the field site instead of the above-mentioned $SF_6$.

For a better understanding of the invention, reference may be had to the following description taken in connection with the accompanying drawing, wherein: the single figure represents a high voltage current transformer embodying one form of the invention.

Referring now to FIG. 1, the current transformer shown therein comprises a metallic tank 10 that is normally at ground potential. This tank 10 has a cylindrical throat portion 12 at its upper end and an annular flange 14 welded thereto. Seated on the flange 14 is a porcelain cylinder 16, the top of which is closed off by a metallic end plate 18.

The primary winding of the current transformer is of a loop-shaped form and comprises a pair of coaxially-disposed conductors, or arms, 20 and 21 extending through the porcelain cylinder 16 into the tank 10, where their lower ends are electrically joined by a generally toroidal-shaped conducting element 22. More specifically, the conductive arm 20 comprises a rigid stud extending through the porcelain cylinder 16 into the tank 10, and the conductive arm 21 comprises a rigid metallic tube surrounding the other conductive arm and locally insulated therefrom by means including insulating spacers 24 and 25. The toroidal shape conductor 22 is provided with a gap 26 to render it non-continuous and has its ends on opposite sides of the gap locally insulated from each other and electrically joined to the lower ends of the conductive arms 50 and 51, respectively. The end of the toroid 22 that is connected to the conductive arm 21 is locally insulated from the conductive arm 20.

The end plate 18 is electrically connected to the tubular conductor 21 and constitutes one terminal of the current transformer primary winding. The upper end of the conductive stud 20 constitutes the opposite terminal. The two terminals are locally insulated from each other by the insulating spacer 24. Primary current will flow between these terminals through a circuit that comprises tubular arm 21, toroidal conductor 22 and the conductive stud 20. The secondary winding of the current transformer is shown at 30 encircling the toroidal conductive element 22. This secondary winding 30 is partially enclosed by a toroidal metallic shield 32. The shield 32 is suitably mounted on a metallic supporting plate 34 extending across the bottom of the tank 10. The toroidal shield 32, like the tank 10, is at ground potential.

For insulating the high potential primary circuit 20, 21, 22 from the grounded tank 10 and other adjacent parts which are at a low potential, I fill the housing 10, 16 with a pressurized mixture of insulating gases. In a preferred form of the invention, this mixture consists essentially of nitrogen, $CCl_2F_2$, and $SF_6$, the respective partial pressures at room temperature being 3-20 p.s.i.a. for the nitrogen, 5-15 p.s.i.a. for the $CCl_2F_2$ and 30-60 p.s.i.a. for the $SF_6$, the sum of the partial pressures of the nitrogen and $CCl_2F_2$ being 17-25 p.s.i.a. In a preferred specific embodiment of the invention, the partial pressure at room temperature of the nitrogen is about 8 p.s.i.a., the $CCl_2F_2$ about 12 p.s.i.a., and the $SF_6$ about 45 p.s.i.a.

Sulfur hexafluoride, in its pure form, is a widely-used insulating gas that has excellent dielectric properties. One of its important advantages is a low dew point which enables it to be used at relatively high pressures without liquefying at temperatures down to the industry standard value of —30° C. or lower. More specifically, it can be used at pressures up to 65 p.s.i.a., measured at room temperature, and yet retain a dew point below —30° C. A disadvantage, however, of sulfur hexafluoride is its relatively high cost.

As pointed out hereinabove, an object of the invention is to provide gaseous insulation that has a dielectric strength substantially as high as that of $SF_6$ at 65 p.s.i.a., has a dew point below —30° C. but is considerably less expensive than $SF_6$.

This object, as well as certain other important advantages, can be realized by relying upon the above-described mixture of nitrogen, $CCl_2F_2$ and $SF_6$, i.e., about 8 p.s.i.a. nitrogen, 12 p.s.i.a. $CCl_2F_2$ and 45 p.s.i.a. $SF_6$. In this connection, nitrogen and $CCl_2F_2$ are much less expensive gases than $SF_6$ and thus using these gases instead of about 20 p.s.i.a. of the previously-used $SF_6$ significantly reduces the cost of the dielectric gas. The dielectric strength of this mixture has been tested and found to be about the same as that of pure $SF_6$ under corresponding pressure and voltage conditions. Although nitrogen tends to reduce the dielectric strength of the mixture very slightly, this reduction is compensated for by the tendency of the $CCl_2F_2$ to increase the dielectric strength. The maximum amount of $CCl_2F_2$ will be limited however by the relatively high dew point of the $CCl_2F_2$. In this regard, $CCl_2F_2$ has a substantially higher dew point than $SF_6$ of the same pressure, but by using only about 12 p.s.i.a. of the $CCl_2F_2$, I can still hold the dew point of the mixture to about —36° C., which is well below the —30° C. industry standard requirement.

The amount of $CCl_2F_2$ can be increased slightly, beyond the above-mentioned 12 p.s.i.a. without raising the dew point of the mixture to an objectionably high value, but for pressures greater than about 15 p.s.i.a. (measured at room temperature) the dew point of the mixture becomes too high to meet the —30° C. standard. Accordingly, the maximum $CCl_2F_2$ pressure is about 15 p.s.i.a., measured at room temperature. The minimum amount of $CCl_2F_2$ that can be used is governed primarily by dielectric strength requirements. As pointed out hereinabove, replacing $SF_6$ with nitrogen tends to lower the dielectric strength of the mixture, but this is compensated for by the presence of the $CCl_2F_2$ which has a higher dielectric strength than $SF_6$ and thus tends to increase the dielectric strength of the mixture. To maintain this dielectric strength of the mixture within about 85 to 90 percent of that of pure $SF_6$, I keep the minimum pressure of the $CCl_2F_2$ at least as high as 5 p.s.i.a., if using a total pressure in the neighborhood of 65 p.s.i.a.

The following method is used for incorporating the gaseous insulating mixture in the housing 10, 16. After the current transformer has been completely assembled but is still in the factory, the housing 10, 16 is filled with a mixture of air and $CCl_2F_2$ to permit it to be checked for major leaks. The pressure of the air-$CCl_2F_2$ mixture is raised to a value of about 65 p.s.i.a. to simulate actual field condition. Leaks are located preferably with a conventional halogen leak detector, and it is to facilitate such leak-detection that the $CCl_2F_2$ is included in this initial mixture. A suitable pressure for the $CCl_2F_2$ in this initial mixture is about 2 p.s.ia. After the major leaks are detected and repaired, the initial gas mixture is exhausted from the enclosure 10, 16.

The pressure inside the enclosure is then reduced to a value of about 1000 microns absolute so as to extract water and water vapor from the internal parts of the current transformer. After this low pressure has been maintained for a suitable period by a vacuum pump, which removes the evolved water and water vapor, the enclosure is filled with a mixture of about 40 percent nitrogen and 60 percent $CC_2F_2$ by volume. Enough of the mixture is included to raise the pressure to about 35 p.s.i.a. This pressure could be selected as high as 65 p.s.i.a., or higher, if the dielectric strength of the structure were low enough to require this. At this pressure, high potential tests are run to check the ability of the current transformer to withstand high voltages. This mixture of nitrogen and $CCl_2F_2$ has a dielectric strength only about 15 to 25 percent lower than that of pure $SF_6$ at the same pressure; so the voltages used for these high potential tests can be as high as those used when pure $SF_6$ is relied upon. The slightly lower dielectric strength of mixture is not a disadvantage because it more readily reveals any potential weaknesses that could later cause dielectric problems, and therefore maintains a slightly higher quality level for the electrical equipment.

Another advantage of using the nitrogen-$CCl_2F_2$ mixture for the high potential tests is that it greatly facilitates locating the source of any dielectric difficulties. In this respect, any spark-over occurring in the nitrogen-$CCl_2F_2$ mixture will leave a small black mark of carbon at the point of the spark-over. With the spark-over location thus pin-pointed, it is a much easier matter to correct the conditions responsible for the spark-over than it would otherwise be.

Assuming that no spark-overs have occurred during the high potential tests, the next step is to increase the pressure of the nitrogen-$CCl_2F_2$ mixture to a value corresponding to the field pressure, e.g, about 65 p.s.i.a. At this pressure, a final leak test is made. The large amount of $CCl_2F_2$ which is then present in the mixture enables this test to be made relatively quickly with a halogen leak detector in view of the halogen leak detector's high sensitivity to $CCl_2F_2$.

It is to be noted that the pressure of the nitrogen-$CCl_2F_2$ mixture during this leak-testing in the factory can be as high as 65 p.s.i.a. without causing any liquefication of the $CCl_2F_2$. This assumes that the ambient temperature inside the involved factory area will be maintained above about 50° F. which is a value well below the normal minimum temperature that is ordinarily maintained in a factory. Thus, I am able to handle the nitrogen-$CCl_2F_2$ mixture in the factory without liquefication and moreover without any special heaters in the gas handling system. It is desirable to void any liquefication of the $CCl_2F_2$ because this would interfere with maintaining precise control over the amounts of gas used in the electrical apparatus.

After the leak-testing operation has been completed and all leaks have been located and repaired, gas is removed from the enclosure 10, 16 and returned to a suitable storage tank for reuse. When the pressure reaches about 20 p.s.i.a., no further gas is removed. At 20 p.s.i.a., the partial pressures in the 40 percent nitrogen and 60 percent $CCl_2F_2$ mixture will be 8 p.s.i.a. for the nitrogen and 12 p.s.i.a. for the $CCl_2F_2$ When the total pressure has been reduced to 20 p.s.i.a, the current transformer is ready for shipment to a field site.

The pressure of the gas during shipment must be kept relatively low in order to meet certain established requirements for safe handling during shipment, and this is one factor accounting for the above-described reduction in pressure to above 20 p.s.i.a. In certain situations, it is permissible that this pressure during shipment be as high as 25 p.s.i.a. The minimum pressure during shipment should be substantially above atmospheric so that it is possible to determine by referring to a pressure gage (not shown) whether any significant leaks have occurred since the apparatus left the factory. When the current transformer reaches its field site, it is installed and then a supply of sulfur hexafluoride is added. The manufacturer of the current transformer typically supplies this $SF_6$ in a pressurized bottle, and the $SF_6$ will be added from this bottle until the pressure reaches about 65 p.s.i.a., referred to room temperature.

In the above-described processing steps, the gases are added to and removed from the tank 10 through one or more suitable valves, such as shown schematically at 40.

An unexpected advantage that is obtained from using this mixture of nitrogen, $CCl_2F_2$ and $SF_6$ is that sparkovers occurring in this mixture will not produce any visible carbon deposits. As pointed out hereinabove, a spark-over in the nitrogen-$CCl_2F_2$ mixture does produce carbon, but when the $SF_6$ is present, there is no evidence of generation of any significant amount of carbon. Avoiding carbon formation is advantageous in that insulation can be significantly impaired by any carbon deposited thereon. It is to be noted that the above-described processing in the factory was performed without using only sulfur hexafluoride at all. Only air, nitrogen, and $CCl_2F_2$ were used in the factory. This is a very substantial advantage because $SF_6$ is a much more expensive gas than the nitrogen or $CCl_2F_2$ that is used. There is a certain amount of gas that will be lost during factory processing, and if this lost gas is an expensive one like $SF_6$, then the expense of lost gas can be very substantial. I have been able to greatly reduce this expense by completely eliminating $SF_6$ from the factory processing steps. Yet this has been done without affecting the reliability of any dielectric strength tests, any leak tests, or any other factory tests. Moreover, the use of $CCl_2F_2$ instead of $SF_6$ in factory processing has made it easier to locate the source of dielectric problems and has made it easier to detect leaks with a conventional halogen leak detector, which is relatively insensitive to $SF_6$ but is highly sensitive to $CCl_2F_2$.

In addition, the final gas mixture is less expensive than pure $SF_6$, has a dielectric strength substantially as high as that of pure $SF_6$ at a corresponding pressure and has a dew point below the $-30°$ C. industry standard requirement.

Although I prefer to use nitrogen as one of the three ingredients of the insulating mixture, my invention in its broader aspects comprehends the use of some other suitable filler gas, such as air, in place of all or part of the nitrogen. This substitute gas should have a dew point lower than the $CCl_2F_2$ so as not to increase the effective dew point on the mixture above $-30°$ C. and should be of such a character that it does not reduce the dielectric strength of the end mixture substantially from that of the nitrogen-$CCl_2F_2$-$SF_6$ mixture.

In its broader aspects my invention also comprehends the use of perfluorobutane ($C_2F_6$) in place of the $SF_6$. $C_2F_6$ has a dielectric strength slightly inferior to that of $SF_6$ at corresponding pressures, but the pressure of $C_2F_6$ can be raised to a higher value without increasing its dew point above the $-30$ to $-40°$ C. maximum. By using this higher pressure for the $C_2F_6$, its dielectric strength can be raised to a level equal to or even higher than that of the $SF_6$. In practicing the invention with $C_2F_6$, the $C_2F_6$ is added to the apparatus at the field site in the same manner as was described hereinabove with respect to the $SF_6$.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. Electric apparatus comprising:
    (a) spaced-apart portions which during operation of the apparatus are at different electrical potentials,
    (b) an enclosure,
    (c) a gaseous electrical insulating medium in said enclosure between said spaced-apart portions,
    (d) said insulating medium consisting essentially of a mixture of nitrogen, $CCl_2F_2$, and $SF_6$, the partial pressures at room temperature being 3–20 p.s.i.a. for the nitrogen, 5–15 p.s.i.a. for the $CCl_2F_2$, and 30–60 p.s.i.a. for the $SF_6$, the sum of the partial pressures for the nitrogen and $CCl_2F_2$ being 17–25 p.s.i.a.

2. The apparatus of claim 1 in which the partial pressure of said nitrogen is about 8 p.s.i.a. and the partial pressure of said $CCl_2F_2$ is about 12 p.s.i.a., both referred to room temperature.

3. Electric apparatus comprising:
    (a) spaced-apart portions which during operation of the apparatus are at different electrical potentials,
    (b) an enclosure,
    (c) a gaseous electrical insulating medium in said enclosure between said spaced-apart portions,
    (d) said insulating medium consisting essentially of a mixture of a filler gas, $CCl_2F_2$, and $SF_6$, the partial pressures at room temperature being 3–20 p.s.i.a. for the filler gas, 5–15 p.s.i.a. for the $CCl_2F_2$, and 30–60 p.s.i.a. for the $SF_6$, the sum of the partial pressures for the filler gas and $CCl_2F_2$ being 17–25 p.s.i.a., and
    (e) said filler gas having a dew point lower than the dew point of $CCl_2F_2$ at a corresponding pressure.

4. Electric apparatus comprising:
    (a) spaced-apart portions which during operation of the apparatus are at different electrical potentials,
    (b) an enclosure,
    (c) a gaseous electrical insulating medium in said enclosure between said spaced-apart portions,
    (d) said insulating medium consisting essentially of a mixture of nitrogen, $CCl_2F_2$ and $C_2F_6$, the partial pressures at room temperature being 3–20 p.s.i.a. for the nitrogen, 5–15 p.s.i.a. for the $CCl_2F_2$, and greater than 30 p.s.i.a. for the $C_2F_6$, the sum of the partial pressures for the nitrogen and $CCl_2F_2$ being 17–25 p.s.i.a.

5. A method of providing enclosed electrical apparatus with a gaseous insulating medium for electrically insulating spaced-apart portions thereof from each other, comprising the steps of:
    (a) evacuating the enclosure,
    (b) filling the enclosure to a relatively high pressure with a mixture of nitrogen and $CCl_2F_2$,
    (c) subjecting the apparatus to a high potential test and to a leak test while said enclosure is filled with said pressurized mixture of nitrogen and $CCl_2F_2$,
    (d) said high potential test involving establishing high voltages between said spaced-apart portions,
    (e) reducing the pressure of said mixture to a relatively low value, but a value that substantially exceeds atmospheric pressure,
    (f) shipping the apparatus to a field site with the nitrogen and $CCl_2F_2$ mixture in place,
    (g) adding to the apparatus at the field site a quantity of gas selected from the group consisting of $SF_6$ and $C_2F_6$.

6. The method of claim 5 in which the gas added at the field site is $SF_6$.

7. The method of claim 5 in which the gas added at the field site is $C_2F_6$.

8. The method of claim 5 in which the partial pressure of the nitrogen is about 8 p.s.i.a. and the partial pressure of the $CCl_2F_2$ is about 12 p.s.i.a. at the time said shipping occurs.

9. A method of providing enclosed electrical apparatus with a gaseous insulating medium for electrically insulating spaced-apart portions thereof from each other, comprising the steps of:
- (a) evacuating the enclosure to a low sub-atmospheric pressure and maintaining said low sub-atmospheric pressure for a period long enough to remove appreciable quantities of water vapor,
- (b) filling the enclosure to a relatively high pressure with a gaseous mixture that is free of $SF_6$ and $C_2F_6$ and consists essentially of $CCl_2F_2$ and a filter gas having a dew point lower than $CCl_2F_2$,
- (c) subjecting the apparatus to a high potential test and to a leak test while said enclosure is filled with said pressurized mixture of filler gas and $CCl_2F_2$,
- (d) said high potential test involving establishing high voltages between said spaced-apart parts,
- (e) reducing the pressure of said mixture to a relatively low value, but a value that substantially exceeds atmospheric pressure,
- (f) shipping the apparatus to a field site with the filler gas and $CCl_2F_2$ in place,
- (g) adding to the apparatus at the field site a quantity of gas selected from the group consisting of $SF_6$ and $C_2F_6$.

References Cited by the Applicant

UNITED STATES PATENTS

| | | |
|---|---|---|
| 2,221,670 | 11/1940 | Cooper. |
| 2,757,261 | 7/1956 | Lingal et al. |
| 2,853,540 | 9/1958 | Camilli et al. |

OTHER REFERENCES

Skilling et al.: "The Electrical Strength of Nitrogen and Freon Under Pressure" from AIEE Transactions, vol. 61, April 1942, pp. 191–5.

LEWIS H. MYERS, *Primary Examiner.*